US005272327A

United States Patent [19]

Mitchell et al.

[11] Patent Number: 5,272,327

[45] Date of Patent: Dec. 21, 1993

[54] CONSTANT BRIGHTNESS LIQUID CRYSTAL DISPLAY BACKLIGHT CONTROL SYSTEM

[75] Inventors: Nathan A. Mitchell; Phillip J. McKenzie, both of Houston, Tex.

[73] Assignee: Compaq Computer Corporation, Houston, Tex.

[21] Appl. No.: 888,914

[22] Filed: May 26, 1992

[51] Int. Cl.[5] ............................................ G01J 1/32

[52] U.S. Cl. .................................... 250/205; 315/158

[58] Field of Search ................ 250/205; 315/151, 153, 315/158

[56] References Cited

U.S. PATENT DOCUMENTS

| | | | |
|---|---|---|---|
| 4,260,882 | 4/1981 | Barnes | 250/205 |
| 4,717,863 | 1/1988 | Zeiler | 315/158 |
| 4,959,755 | 9/1990 | Hochstein | 250/205 |
| 5,012,314 | 4/1991 | Tobita et al. | 250/205 |
| 5,030,887 | 7/1991 | Guisinger | 315/158 |

*Primary Examiner*—David C. Nelms
*Attorney, Agent, or Firm*—Pravel, Hewitt, Kimball & Krieger

[57] ABSTRACT

A LCD backlight system which regulates the light generated by the lamp by controlling the intensity of the light using a photoresistor cell. The current provided to the lamp is controlled by a pulse width modulation (PWM) signal. The PWM signal responds to brightness adjustments by the user and to a photoresistor exposed to the light from the lamp. An operational amplifier circuit controls the PWM signal so that if the lamp is too bright, the current to the lamp is reduced, and if the lamp is too dim, the current to the lamp is increased. When the lamp brightness reaches the appropriate intensity, the output of the operational amplifier is unchanging, causing the intensity of the lamp to remain stable.

18 Claims, 2 Drawing Sheets

CONSTANT BRIGHTNESS LIQUID CRYSTAL DISPLAY BACKLIGHT CONTROL SYSTEM

BACKGROUND OF THE INVENTION

1. Field of the Invention

The invention generally relates to backlights for liquid crystal displays, and more particularly, to a backlight system providing a constant brightness.

2. Description of the Related Art

Liquid crystal displays (LCD) are commonly used in portable computer systems, televisions and other electronic devices. An LCD requires a source of light for operation because the LCD is effectively a light valve, allowing transmission of light in one state and blocking transmission of light in a second state. Backlighting the LCD has become the most popular source of light in personal computer systems because of the improved contrast ratio and brightness. LCDs have become especially popular in portable computer applications because they are sufficiently rugged and require little space to operate.

Backlighting is generally provided to LCDs using a fluorescent lamp and some means for diffusing the light generated by the lamp to create a uniform pattern of light behind the LCD. A preferred diffusion technique is shown in U.S. Pat. No. 5,050,946 entitled "Faceted Light Pipe." The intensity of the light generated by a fluorescent lamp generally depends upon the current through the lamp and the lamp's temperature. Constant current or input voltage feed forward supplies have conventionally been used to ensure that the backlight current remains steady, so that the brightness remains relatively steady.

When a fluorescent lamp first receives power, however, it is generally cold. Cold fluorescent lamps generally provide relatively little light, and generate increasing light as the temperature increases. Consequently, when the computer system is first turned on, the display often appears unusually dim. To improve the display's readability, the user frequently adjusts the brightness control. As the fluorescent lamp warms up, the intensity of the light generated by the lamp increases. This increase is so gradual, however, that the user's eyes often adjust and the user is unlikely to notice the increased brightness.

If the user happens to notice the increased brightness, he is likely to adjust the contrast instead of the brightness to improve the display's readability. Although adjusting the contrast changes the apparent brightness of the display, the actual brightness of the lamp is not affected. Instead, the ratio of the luminance values for the foreground and background on the display is changed. Consequently, adjusting the contrast on an LCD does not affect the current through the lamp, so the current drain on the battery in the computer system is higher than if the brightness had been adjusted. As a result, the unnecessary brightness of the lamp reduces the battery life for the entire system.

SUMMARY OF THE PRESENT INVENTION

An LCD backlight system according to the present invention regulates the light generated by the fluorescent lamp by controlling the intensity of the light using a photoresistor cell. The current provided to the lamp is controlled by a pulse width modulated (PWM) signal. To permit the user to manually adjust the brightness of the display, a potentiometer regulates the output of a voltage divider. The output of this voltage divider is compared with the output of a voltage divider regulated by a photoresistor exposed to the light from the lamp. If the output of the potentiometer voltage divider is different from the output of the photoresistor voltage divider, an amplifier amplifies the difference and provides it to the PWM signal generator. Consequently, if the brightness of the lamp varies from its setting according to the potentiometer, the resistance of the photoresistor changes, causing a difference in the voltage divider signals. The difference in the signals changes the duty cycle of the PWM signal, thus increasing or decreasing the current provided to the lamp. When the lamp brightness reaches the appropriate intensity, the output of each voltage divider is identical, causing the intensity of the lamp to remain stable. Thus, the intensity of the light generated by the lamp directly affects the amount of current provided to the lamp.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
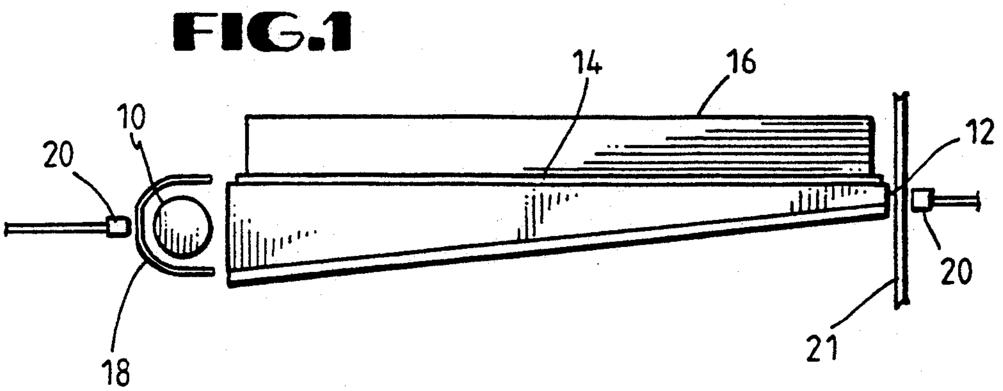
FIG. 1 is a side view of an LCD and backlight for a portable computer incorporating the present invention.

FIG. 1 generally illustrates a conventional system for backlighting an LCD 16 for a portable computer. The system provides a generally uniform light pattern behind the LCD 16 so that the opaque symbols on the LCD 16 contrast with the lighted background. It should be noted that the present system affects brightness, which is the overall luminance. Brightness must be distinguished from contrast, which is the difference between the maximum and minimum luminance values for an image on the display. The present system only varies the display's brightness, and has no effect on contrast.

A fluorescent lamp 10 comprises the light source for the system. The lamp 10 is located at the end of a light pipe 12 having some means of scattering the light. Various methods of scattering light, any of which may be used in the present system, diffuse the light from the lamp more or less evenly through the LCD, including a scattering structure printed on the front surface of the light pipe 12, a variable density scattering structure within the pipe 12, or a faceted surface for reflecting the light as shown in U.S. Pat. No. 5,050,946. The light pipes shown in U.S. Pat. No. 5,050,946 are the preferred units. Although the scattering means disperses the light, the light is further diffused by a diffuser 14, which is generally a translucent plastic material which produces a more uniform display. The LCD 16 is placed in front of the diffuse light pattern created by the light pipe 12 and the diffuser 14 so that light passes through the translucent LCD 16, contrasting with the opaque letters and symbols on the LCD 16.

Figure 2:
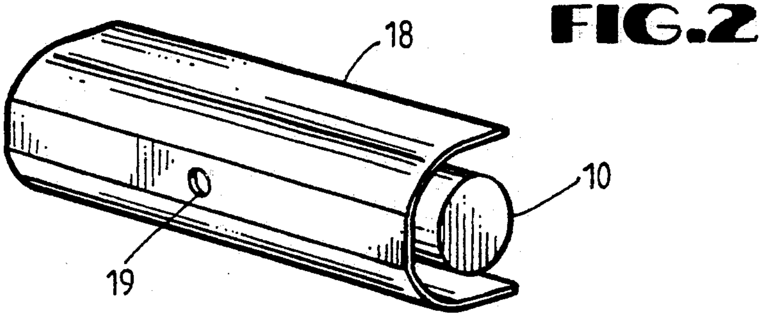
FIG. 2 is a perspective view of portions of the backlight of FIG. 1.

To more effectively illuminate the LCD 16, a reflector 18 is provided around the lamp 10 so that the light generated by the lamp 10 is directed into the light pipe 12. In one embodiment, a small hole 19 (FIG. 2) is formed in the side of the reflector 18 on the opposite side of the lamp 10 from the light pipe 12. A photoresistor 20 is positioned adjacent the hole so that the photoresistor 20 is directly exposed to the light from the lamp 10. The physical properties of the photoresistor 20 cause the resistance of the photoresistor 20 to vary as a function of the intensity of the light to which it is exposed. The photoresistor 20 is composed of cadmium sulfide, which is well known in the art as a material having photoresistive properties. In this embodiment, the resistance of the photoresistor 20 increases as the intensity of the light from the lamp 10 decreases, and vice versa. In a second and preferred embodiment, the photoresistor 20 is located at the end of the light pipe 12 opposite the lamp 10 with a hole in the appropriate bracketry 21 to allow the photoresistor 20 to receive the light passing through the light pipe 12.

Figure 4:
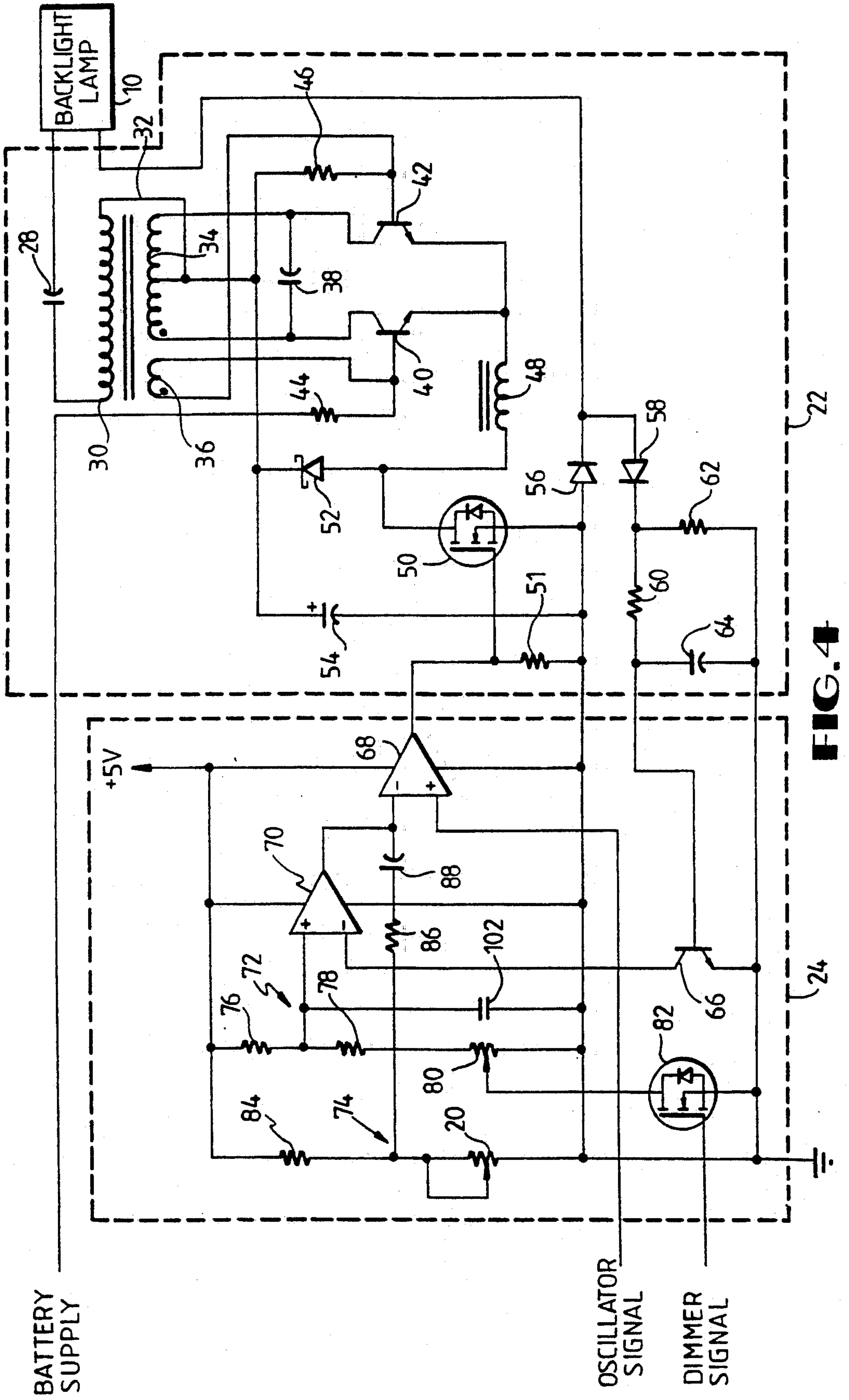
FIG. 4 is a schematic diagram of backlight lamp control circuitry according to the present invention.

The intensity of the light generated by the lamp 10, and thus the resistance of the photoresistor 20, is controlled by a power supply and a control system shown in FIG. 4. Power is supplied to the lamp 10 by backlight power circuitry 22 which generates a variable AC signal. Although the frequency of the AC signal remains substantially constant, the current generated by the backlight power circuitry 22 varies. The intensity of the light generated by the lamp 10 depends upon the RMS value of the current delivered by the backlight power circuitry 22, and the temperature of the lamp 10.

The current generated by the backlight power circuitry 22 is controlled by backlight control circuitry 24. A pulse width modulated (PWM) signal generated by the backlight control circuitry 24 controls the current to the lamp 10 from the power circuitry 22. The PWM signal responds to two variables. First, a brightness potentiometer 80 controlled by the user regulates the PWM signal to the power circuitry 22. The brightness potentiometer 80 is a manually adjustable resistor which the user can operate to brighten or dim the display. Second, the resistance of the photoresistor 20, which varies in accordance with the intensity of the light generated by the lamp 10, affects the PWM signal and stabilizes the intensity of the light generated by the lamp 10 at the level set by the potentiometer 80, as discussed in detail below.

Figure 3:
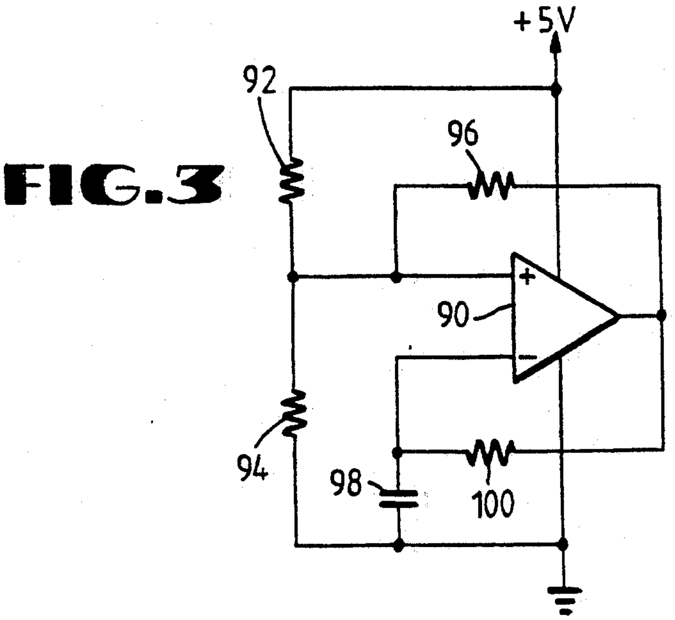
FIG. 3 is a schematic diagram of an oscillator circuit.

To generate the PWM signal, the backlight control circuitry 24 receives a steadily oscillating signal from an oscillator 26. Referring now to FIG. 3, a comparator 90, preferably a Texas Instruments TLC3702 having a totem pole output, is used as the active element in the oscillator 26. Other equivalent devices could be utilized. A resistor 92 is connected between the 5 volt line and the noninverting input of the comparator 90. A resistor 94 is connected between the noninverting input and ground. A resistor 96 is connected between the noninverting input and the output of the comparator 90 to provided feedback. A capacitor 98 is connected between the inverting input of the comparator 90 and ground. A resistor 100 is connected between the output and the inverting input of the comparator 90. This configuration results in an oscillator, with the output of the comparator 90 being a square wave, with a triangular waveform appearing at the inverting input. Preferably the triangular waveform oscillates between $\frac{1}{3}$ and $\frac{2}{3}$ of the 5 volt supply. These points are developed by the selection of the values of resistors 92, 94 and 96, so that when the output is high, the noninverting input has a 3.33V level and when the output is low, the noninverting input has a 1.67V level. Then as the capacitor 98 is charged or discharged through resistor 100, the output changes at the $\frac{1}{3}$ and $\frac{2}{3}$ points. In the preferred embodiment, the oscillator 26 delivers a substantially triangular waveform having a frequency of approximately 100 kHz. It is understood that numerous other oscillator designs could be utilized to develop the preferred triangular waveform.

Returning to FIG. 4, the current for the backlight lamp is generated by the backlight power circuitry 22, which includes a DC to AC inverter comprising a single transformer and two transistors. An inverter of this type is often referred to as a current-fed Royer oscillator. The DC voltage for the inverter is supplied by the system DC supply, preferably the battery voltage in a portable computer. The first terminal of the backlight lamp 10 is connected to a terminal of a capacitor 28, and the capacitor's 28 other terminal is connected to one terminal of a secondary coil 30 of a transformer 32. The capacitor 28 serves to limit the current to the lamp 10 so that the lamp 10 is not damaged by excessive current, yet the capacitor 28 does not dissipate significant power.

In addition to the secondary coil 30, the transformer 32 includes a center tapped primary coil 34 and a base drive coil 36. The second terminal of the secondary coil 32 is connected to the center tap of the primary coil 34. Because the secondary coil 30 generates extremely high voltage relative to the primary coil 34, connecting the secondary coil 30 to the center tap merely connects the secondary coil 30 to a lower reference voltage. If convenient, the secondary coil 30 could be connected to ground. The center tap of the primary coil 34 is also connected to the battery voltage supplied by the computer system to drive the transformer 32.

The end terminals of the primary coil 34, on the other hand, are connected to the opposite terminals of a capacitor 38, and each end terminal of the primary coil 34 is further connected to a collector of an NPN bi-polar junction transistor (BJT) 40, 42. The base of each BJT 40, 42 is connected to a resistor 44, 46, and each resistor 44, 46 is further connected to the battery voltage. In addition, the bases of the BJTs 40, 42 are connected to the opposite terminals of a base coil 36 of the transformer 32. Therefore, when the base coil 36 is polarized in one direction, one of the BJTs 40, 42 is activated and the other is deactivated. When the base drive coil 36 reverses polarity, the status of each BJT 40, 42 switches, so that the BJTs 40, 42 alternately switch on and off.

The emitter of each BJT 40, 42 is connected to a terminal of an inductor 48 having its other terminal connected to the drain of an n-channel enhancement-mode metal oxide silicon field effect transistor (MOSFET) 50. The source of the MOSFET 50 is connected to ground, and the gate of the MOSFET 50 receives the PWM signal generated by the backlight control circuitry 24. The gate is also connected to a resistor 51 which is also connected to ground. Therefore, when the PWM signal is logic level high, the MOSFET 50 is turned on and shorts one end of the inductor 48 to ground. Conversely, when the PWM signal is logic level low, the MOSFET 50 is off, creating an open circuit between the inductor 48 and ground.

This circuit generates an AC signal to the backlight lamp 10 by inverting and stepping up the DC battery supply signal. When the PWM signal closes the MOSFET 50 connection to ground, the battery voltage is asserted across the coils 34 through one of the BJTs 40, 42. The voltage generated by the base coil 36 controls which BJT 40, 42 is activated. The base coil 36 switches polarity when the flux in the transformer core reaches its positive and negative saturation points. When the first BJT 40 activates at one of the saturation points of the core, the second BJT 42 turns off, placing the battery voltage across the left half of the primary coil 34. Similarly, when the flux in the transformer core reaches the opposite saturation point, the first BJT 40 turns off and the second BJT 42 turns on, causing the battery voltage to be placed across the right half of the coil 34. This causes current to flow in alternating halves of the primary coil 34, inducing an alternating current in the secondary coil 30, which is provided to the backlight lamp 10. The inductor 48 maintains a constant current flowing through the emitters of BJTs 40, 42.

When the MOSFET 50 is cut off, the inductor 48 continues to provide a decreasing current. To conduct this current, the anode of a Schottky diode 52 is connected to the inductor 48. The cathode is connected to the battery voltage so that the current is directed back into the supply line. Finally, a capacitor 54 is connected between the battery voltage and ground to dissipate sudden fluctuations and noise in the battery voltage.

To close the lamp 10 current circuit, the second terminal of the lamp 10 is connected to the cathode of a first diode 56 and the anode of a second diode 58. The anode of the first diode 56 is connected to ground. The cathode of the second diode 58 is connected to a pair of resistors 60, 62. The second terminal of the first resistor 62 is connected to ground, and the second terminal of the second resistor 60 is connected to a capacitor 64, which is connected to ground, and to the base of an NPN BJT 66. This circuit is a current limiter circuit to prevent damage to the lamp 10. The collector of the BJT 66 is connected to the inverting input of an operational amplifier 70, which is discussed below, and the emitter of the BJT 66 is connected to ground. Therefore, if enough current passes through the lamp 10 to cause sufficient voltage at the node of the resistor 60 and the capacitor 64 to turn the BJT 66 on, the inverting input of the operational amplifier 70 is connected to ground. As discussed below, this causes the control signal from the operational amplifier 70 to increase, thus reducing the duration of the duty cycle of the PWM signal. Consequently, the current delivered to the lamp 10 is clamped at a maximum value.

To control the backlight power circuitry 22, the control circuitry 24 includes a comparator 68, again preferably a TLC3702 or equivalent device, and which generates the PWM signal provided to the power circuitry 22. The noninverting input of the comparator 68 receives the 100 kHz triangular waveform present at the inverting input of the comparator 90 in the oscillator 26. The inverting input of the comparator 68 receives a control signal which controls the duration of the positive pulse delivered by the comparator 68, thus generating a PWM signal. When the voltage of the oscillator signal is above the control signal voltage, the comparator 68 generates a logic level high signal of 5 volts. Conversely, when the oscillator signal is below the voltage of the control signal, the comparator 68 produces a low signal of approximately zero volts. Thus, the PWM signal can be controlled by raising and lowering the control signal supplied to the comparator 68 at the negative input.

The control signal is generated by the output of the operational amplifier 70. The power supply inputs of the operational amplifier 70 are connected to +5 volts and ground, respectively. By creating a difference between the voltages received at the noninverting and inverting inputs of the operational amplifier 70, the control signal output of the operational amplifier 70 can be manipulated. A pair of voltage divider circuits 72, 74 control the signals received at the noninverting and inverting inputs of the operational amplifier 70. The first voltage divider circuit 72 comprises two resistors in which the first resistor 76 has double the resistance of the second resistor 78. The first resistor 76 is connected to the +5 volt line and has its second terminal connected to a terminal of the second resistor 78 and the noninverting input of the operational amplifier 70. The other terminal of the second resistor 78 is connected to the brightness potentiometer 80. The brightness potentiometer 80 is controlled manually by the user to vary the brightness according to the user's preference. To increase the brightness, the resistance of the potentiometer 80 is reduced; conversely, to decrease brightness, the potentiometer 80 resistance is increased. The second terminal of the potentiometer 80 is connected to ground, while the variable terminal of the potentiometer 80 is connected to a dimmer transistor 82, discussed in more detail below. The potentiometer 80 resistance may be varied between zero and the resistance of the first resistor. Consequently, the direct current voltage that may be developed at the noninverting input of the operational amplifier 70 by the voltage divider 72 may vary between $\frac{1}{3}$ and $\frac{3}{5}$ of the supply or 1.67 volts and 3.00 volts in the preferred embodiment. By changing the resistance of the potentiometer 80, the user changes the voltage provided by the voltage divider circuit 72 to the noninverting input of the operational amplifier 70.

The inverting input of the operational amplifier 70 is connected to the second voltage divider circuit 74 controlled by the photoresistor 20 exposed to the lamp 10. The second voltage divider 74 comprises a first resistor 84 having a terminal connected to the +5 volt line and another terminal connected to the inverting input of the operational amplifier 70 and a terminal of the photoresistor 20. The photoresistor's 20 other terminal is connected to ground. In the preferred embodiment, the resistance of the photoresistor 20 increases as the intensity of the light from the lamp 10 decreases. As the intensity of the light diminishes, the resistance of the photoresistor 20 increases, causing the voltage generated by the second voltage divider 74 to increase. The resistance of the resistor 84 depends upon the range of the photoresistor 20. To operate as desired in the preferred embodiment, the second voltage divider 74 should have the same range of values as the first voltage divider 72. Therefore, the second voltage divider 74 should provide $\frac{1}{3}$ supply or 1.67 volts when the lamp 10 is brightest and the photoresistor 20 at its lowest resistance, and should provide 3/5 supply or 3.00 volts when the lamp 10 is dimmest and the photoresistor 20 at its highest resistance. Thus, the resistance of the photoresistor 20 must be determined at the brightest and dimmest levels, and the appropriate resistance of the resistor 84 can then be determined.

The operational amplifier 70 further includes a feedback loop between the output and the inverting input, which includes a resistor 86 and a capacitor 88 in series.

The resistor 86 and capacitor 88 are assigned values to damp natural oscillations in the system. The capacitor 88 creates a DC open circuit for the feedback loop. Consequently, the gain of the amplifier circuit for purposes of inverter control is equal to the operational amplifier's 70 open loop gain, so that even minor differences between the input signals causes significant variations in the operational amplifier 70 output voltage. If the input voltages differ, the difference is amplified by the open loop gain, so that the output of the operational amplifier 70 approaches one of the supply voltages, depending on which input is higher.

The output of the operational amplifier 70 is applied to the inverting input of the comparator 68 to be compared against the triangular waveform from the oscillator 22. Thus when the output of the operational amplifier 70 is increasing, indicating that the lamp 10 is above the user selected level, the output of comparator 68 is high for a decreasing percentage of each oscillator cycle. On the other hand, if the lamp 10 is too dim, the decreasing output of the operational amplifier 70 results in the output of the comparator 68 being high for an increasing percentage of each oscillation signal. Thus the PWM signal tracks the difference between the desired brightness level and the actual level.

As an example, when the system is turned on, the user adjusts the potentiometer 80 to provide the proper backlight intensity. Because the lamp 10 is very dim at first, the resistance of the photoresistor 20 is high, driving the output of the second voltage divider 74 higher than the output of the first voltage divider 72 so that the voltage at the inverted input of the operational amplifier 70 is higher. The gain of the operational amplifier 70 causes the output to decrease, which in turn has the effect of causing the output of the comparator 68 to increase the duty cycle of the PWM signal. As a result, the current supplied to the lamp 10 is maximized.

As the lamp 10 gets brighter, the resistance of the photoresistor 20 decreases, and eventually the output of the two voltage dividers 72, 74 is identical at the level set by the potentiometer 80. When the temperature of the lamp 10 rises, however, the lamp 10 gets brighter, causing the resistance of the of the photoresistor 20 to decrease. Therefore, the output of the second divider 74 becomes less than the output of the first voltage divider 72, causing the output of the operational amplifier 70 to increase. This decreases the duty cycle of the PWM signal, and reducing the current provided to the lamp 10. When the lamp 10 gets dimmer, the resistance of the photoresistor 20 returns to the appropriate level and the outputs of the voltage dividers 72, 74 are again equal. The reverse situation is also true, so that the light output is thus regulated to the desired level.

The backlight control circuitry 24 is also affected by the dimmer signal asserted by the computer system. The dimmer signal is an active low signal generated by the computer system to reduce the power consumption by the display. The dimmer signal is connected to the gate of the MOSFET 82, which has its source connected to ground and its drain connected to the variable terminal of the brightness potentiometer 80. While the dimmer signal is inactive and high, the MOSFET 82 acts as a short circuit between the potentiometer's 80 variable terminal and ground. Consequently, the brightness designated by the user controls the brightness of the lamp 10. When the dimmer signal is activated low, however, the variable terminal of the potentiometer 80 is disconnected, causing the full resistance of the potentiometer 80 to be added to the voltage divider circuit 72. As a result, the voltage asserted by the first voltage divider 72 circuit increases to its maximum, thus indicating a desire for a reduced light output. Therefore, the duty cycle of the PWM signal is minimized, thus reducing the current provided to the lamp 10.

By using this method of limiting the duty cycle of the PWM signal through the MOSFET 82, the computer can be programmed to limit the maximum brightness of the lamp. For example, if the user is dissatisfied with the full range of brightness, the computer could be programmed to reduce the overall brightness of the lamp. Using this feature, the maximum brightness adjustment using the potentiometer 80 is reduced, and all of the potentiometer 80 brightness settings between the minimum and maximum are proportionally reduced. The computer implements this brightness limiting function by intermittently driving the dimmer signal high and turning on the MOSFET 82 so that, as discussed above, the output of the first voltage divider circuit is intermittently increased and the duty cycle of the PWM signal is intermittently reduced. A capacitor 102 connected between the noninverting input of the operational amplifier 70 and ground smooths the increase and decrease of the voltage divider signal at the noninverting input. As a result, the average duty cycle of the PWM signal is decreased by the percentage of time that the dimmer signal is asserted, therefore reducing the amount of current delivered to the lamp.

If too much current is delivered to the lamp, the lamp could be damaged and must be replaced. Too much current may be delivered when the backlight system is first turned on and the lamp is cold, so that little light is produced. In response to the low light intensity, the system adjusts to provide more current to the lamp. As the current increases, the voltage at the capacitor 64 and the resistor 60 increases. When the voltage reaches a threshold determined by the resistor and capacitor values, the BJT 66 turns on, connecting the inverting input of the operational amplifier 70 to ground. Because the first voltage divider circuit 72 always asserts a positive voltage while the system is operating, the connection of the inverting input to ground causes the operational amplifier 70 to generate a positive signal, thus reducing the percentage of time that the triangular waveform of the oscillator 26 exceeds the output of the operational amplifier 70. As a result, the duty cycle of the PWM signal generated by the comparator 68 is decreased, and the current delivered to the lamp 10 drops to an acceptable level.

The above disclosure and description of the invention are illustrative and explanatory thereof, and various changes in size, shape, materials, components, circuit elements, wiring connections and contacts, as well as in the details of the illustrated circuitry and construction, may be made without departing from the spirit of the invention.

We claim:

1. A power saving computer display system, comprising:
- a generally planar LCD; and
- means located adjacent said LCD for backlighting said LCD including:
  - a light source including:
    - a current supply generating electrical current;
    - means connected to said current supply for controlling the current generated by said current supply;

a lamp receiving current from said current supply and generating light having an intensity proportional to the amount of said current received from said current supply and having an intensity proportional to the temperature of said lamp for a given current; and determination means for determining the amount of said current to be generated by said current supply, including:

means for indicating a desired intensity of said light generated by said lamp;

means for detecting an actual intensity of said light generated by said lamp;

means connected to said actual intensity detection means and responsive to said detected actual light intensity for indicating said actual intensity of said light generated by said lamp; and means connected to said current supply control means and responsive to said desired intensity indication means and said actual intensity indication means for providing a signal to said current supply control means to control said current generated by said current supply so that said detected actual intensity approaches said desired intensity; and means located adjacent said lamp for scattering the light from said lamp to provide a relatively uniform light through said LCD.

2. The computer display system of claim 1, wherein said desired intensity indication means is manually adjustable.

3. A computer display system of claim 1, wherein said desired intensity indication means includes a voltage divider circuit, including:

a constant resistance having a first terminal connected to a constant voltage, and having a second terminal connected to said current adjustment means; and an adjustable resistance having a first terminal connected to ground and a second terminal connected to said second terminal of said constant resistance and said current adjustment means.

4. The computer display system of claim 3, wherein said adjustable resistance includes a manually adjustably potentiometer.

5. The computer display system of claim 1, wherein said actual intensity detection means includes a photoresistor.

6. The computer display system of claim 1, wherein said actual intensity detection means includes a variable resistance wherein said resistance varies corresponding to said actual intensity of said light.

7. The computer display system of claim 6, wherein said actual intensity indication means includes:

a constant resistance having a first terminal connected to a constant voltage, and having a second terminal connected to said control signal providing means; and wherein said variable resistance has a first terminal connected to ground and a second terminal connected to said second terminal of said constant resistance and said current supply control means.

8. The computer display system of claim 1, wherein said control signal providing means includes:

comparison means having a first input connected to said desired intensity indication means and having a second input connected to said actual intensity indication means and having an output generating a signal corresponding to a difference between said desired intensity and said actual intensity; and a signal generator having an input connected to said output of said comparison means and having an output connected to said current supply control means and generating a signal corresponding to said comparison means signal.

9. The computer display system of claim 8, wherein said comparison means includes an operational amplifier.

10. The computer display system of claim 8, further comprising:

an oscillator having an output generating an oscillating waveform; and wherein said signal generator includes a comparator having a first input connected to said comparison means output and having a second input connected to said oscillator output.

11. The computer display system of claim 10, wherein said signal generated by said signal generator corresponding to said comparison means signal is a pulse width modulated signal.

12. The computer display system of claim 11, wherein said current supply control means is a transistor having a control terminal connected to said signal generator output and responsive to said pulse width modulated signal.

13. The computer display system of claim 5, wherein said means for backlighting further includes:

means surrounding portions of said lamp for reflecting light produced by said lamp to said means for scattering, said reflecting means including an hole, and wherein said photoresistor is located over said hole to receive light produced by said lamp.

14. The computer display system of claim 5, wherein said means for scattering includes a light pipe having two ends, and wherein said lamp is located adjacent one end and said photoresistor is located adjacent said other end.

15. A method for reducing power consumed by a computer having a backlit LCD with a fluorescent lamp providing the light source, the lamp receiving current and generating light having an intensity proportional to the about of said current received and having an intensity proportional to the temperature of said lamp for a given current, the method comprising the steps of:

generating electrical current provided to the lamp;

controlling the current generated; and determining the amount of said current to be generated, including the steps of:

indicating a desired intensity of said light generated by the lamp;

detecting an actual intensity of said light generated by the lamp;

indicating the actual intensity of said light generated by the lamp; and providing a signal to control the current generated to that said detected actual intensity approaches said desired intensity, whereby said actual intensity of said light generated by the lamp remains essentially constant at a given desired intensity setting as the lamp warms up from an initial turned off condition to a full operating temperature condition, thereby reducing the power consumed by the lap as compared to providing a constant current to the lamp over the same condition.

16. The method of claim 15, wherein said step of detecting the actual intensity of said light includes placing a photoresistor adjacent to the lamp.

17. The method claim 15, wherein said backlight includes a light pipe having two ends and said lamp is located adjacent one end and wherein said stop of detecting the actual intensity of said light includes placing a photoresistor adjacent said other end of the lightpipe.

18. The method of claim 15, wherein said stop of indicating a desired intensity includes setting a manually adjustable potentiometer.

* * * * *

UNITED STATES PATENT AND TRADEMARK OFFICE
CERTIFICATE OF CORRECTION

PATENT NO. : 5,272,327

DATED : December 21, 1993

INVENTOR(S) : Nathan A. Mitchell, et al.

It is certified that error appears in the above-identified patent and that said Letters Patent is hereby corrected as shown below:

In col. 9, line 34, please replace "A" with --The--.

In col. 10, line 47, please replace "about" with --amount--.

In col. 10, line 61, please replace "to" with --so--.

In col. 10, line 68, please replace "lap" with --lamp--.

In col. 12, line 4, please replace "stop" with --step--.

Signed and Sealed this

Seventeenth Day of May, 1994

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,272,327
DATED : December 21, 1993
INVENTOR(S) : Nathan A. Mitchell et al.

It is certified that error appears in the above-identified patent and that said Letters Patent is hereby corrected as shown below:

Column 12,
Line 1, delete “stop” and insert therefor -- step --.

Signed and Sealed this

Fifteenth Day of November, 2005

JON W. DUDAS
*Director of the United States Patent and Trademark Office*